United States Patent [19]

Kabacoff et al.

[11] 3,861,932

[45] Jan. 21, 1975

[54] STABILIZATION OF NITROCELLULOSE

[75] Inventors: Bernard L. Kabacoff, Norwalk, Conn.; George Mohr, Eastchester, N.Y.; Charles M. Fairchild, Old Greenwich, Conn.

[73] Assignee: Revlon, Inc., New York, N.Y.

[22] Filed: Dec. 13, 1973

[21] Appl. No.: 424,576

[52] U.S. Cl. ............................... 106/187, 106/195
[51] Int. Cl. ..................... C08b 21/12, C08b 27/42
[58] Field of Search......... 100/187, 195; 260/45.7 R

[56] References Cited

UNITED STATES PATENTS

| | | | |
|---|---|---|---|
| 2,693,492 | 11/1954 | Hoch | 106/187 |
| 3,001,970 | 9/1961 | Ebel | 260/45.7 R |

*Primary Examiner*—Theodore Morris

[57] ABSTRACT

The addition of from about 5 to 80 parts of dibenzoylmethane per 1,500 parts of nitrocellulose in solutions of nitrocellulose prevents discoloration of the nitrocellulose on exposure to light.

5 Claims, No Drawings

STABILIZATION OF NITROCELLULOSE

This invention relates to nitrocellulose coating compositions such as nail enamels. It particularly relates to nitrocellulose coating composition that are stable to light and to a method of preparing such light-stable compositions.

The essential film-forming material in many coatings, such as, for example, collodion membranes and nail enamel is nitrocellulose. This material is present in solution in the compositions which are applied as coatings such as the nail enamel compositions which are applied to the nails. After the application to the nails and the subsequent evaporation of the solvent medium the nitrocellulose remains as a film coating on the nails. This film is usually clear, and may, if desired, contain a suitable dye to impart a color to the nails. These nitrocellulose films are strong and long lasting.

On exposure to light solutions of nitrocellulose, which are normally colorless, are discolored to a yellowish color. This yellow discoloration of the nitrocellulose obviously spoils the appearance of the coating, such as a coating of clear nail enamel. With colored coatings the discoloration of the nitrocellulose results in the discoloration or the appearance of fading of the color of the coating which has been applied.

While the discoloration of the nitrocellulose in solution could be prevented by keeping the solutions in opaque bottles, it is not desirable to use such opaque bottles in marketing nail enamels since the user prefers to see the color of the enamel being purchased. This requires the use of a transparent container.

Other materials such as hydroxy-benzophenones and hydroxyphenylbenzo-triazoles have been used to prevent the discoloration of nitrocellulose in nail enamel preparations, but these materials do not give a lasting effect, and on standing the nitrocellulose changes color.

It is accordingly an object of the present invention to provide nail enamel compositions which are stable to light while in the containers in which they are dispensed.

It is another object of the present invention to provide nail enamel compositions which are stable to light and do not discolor after being applied to the nails.

It is a further object of the present invention to provide nail enamel compositions which are stable to light while standing exposed to light over long periods of time.

In accordance with the present invention I have now found that the addition of dibenzoylmethane to a solution of nitrocellulose such as a nail enamel preparation will prevent the discoloration of the nitrocellulose in liquid nail enamel preparation and in the enamel film after application. A nail enamel preparation contains as essential ingredients nitrocellulose, solvents and plasticizers, the amounts of these ingredients being adjusted to secure compositions having desired viscosities and rates of evaporation. In addition suitable dyes may be added to give desired colors. In practice I have found that the addition of from about 5 to 80 parts by weight of dibenzoylmethane per 1,500 parts by weight of nitrocellulose in the enamel compositions will prevent discoloration of the nitrocellulose in both the solution and the film. Preferably, about 10 to 50 parts of dibenzoylmethane per 1,500 parts nitrocellulose are used. While amounts larger than 80 parts of dibenzoylmethane per 1,500 parts nitrocellulose may be used, at these higher concentrations the dibenzoylmethane itself imparts a color, and it has been found desirable not to use much more than 80 parts of dibenzoylmethane per 1,500 parts nitrocellulose.

The invention will be more fully illustrated in the following examples of compositions prepared according to the present invention. Examples 1–3 show nail enamels and Examples 4 and 5 show clear nitrocellulose solutions. These examples are given by way of illustration and are not to be considered as limiting. In these examples, the numerical values refer to parts by weight.

EXAMPLE 1

| | |
|---|---|
| Nitrocellulose RS 1/2 sec. dry | 15.00 |
| Toluene | 36.80 |
| Dibenzoylmethane | 0.10 |
| Santolite MHP | 7.50 |
| Dibutyl phthalate | 3.75 |
| Butyl acetate | 29.35 |
| Ethanol | 6.40 |
| Butanol | 1.10 |

EXAMPLE 2

| | |
|---|---|
| Nitrocellulose RS 1/2 sec. dry | 14.00 |
| Toluene | 35.80 |
| Dibenzoylmethane | 0.20 |
| Nitrocellulose RS 5–6 sec. dry | 2.00 |
| Santolite MHP | 7.00 |
| Dibutyl phthalate | 3.00 |
| Tricresyl phosphate | 0.75 |
| Butyl acetate | 16.25 |
| Ethyl acetate | 13.15 |
| Isopropanol | 1.00 |
| Ethanol | 6.85 |

EXAMPLE 3

| | |
|---|---|
| Nitrocellulose RS 1/2 sec. dry | 16.0 |
| Toluene | 43.0 |
| Dibenzoylmethane | 0.3 |
| Dibutyl phthalate | 4.0 |
| Tricresyl phosphate | 1.0 |
| Santolite MHP | 3.0 |
| Ethanol | 10.0 |
| Ethyl acetate | 10.7 |
| Butyl acetate | 12.0 |

EXAMPLE 4

| | |
|---|---|
| Nitrocellulose RS 1/4 sec. dry | 22.9 |
| Ethanol | 14.1 |
| Ethyl acetate | 62.8 |
| Dibenzoylmethane | 0.2 |

EXAMPLE 5

| | |
|---|---|
| Nitrocellulose RS 1/2 sec. dry | 20.0 |
| Ethanol | 13.5 |
| Ethyl acetate | 33.2 |
| Toluene | 33.2 |
| Dibenzoylmethane | 0.1 |

The commerically available nitrocellulose is supplied as a mixture of nitrocellulose powder and ethanol. This nitrocelluloseethanol mixture is added to the remaining ingredients and the amounts of nitrocellulose and ethanol in these compositions correspond to the amounts of nitrocellulose and ethanol in such solutions. The legends RS ¼ sec. dry, Rs ½ sec. dry and RS 5–6 sec. dry refer to different viscosity grades of nitrocellulose, the larger the number, the greater the viscosity. Santolite MHP is an arylsulfonamide -formaldehyde condensation resin and is described in Monsanto Technical Bulletin O/PL-320.

The above examples are of clear, colorless solutions, but appropriate dyes or pigments to give desired colors may be added.

Samples of the nail enamels and clear nitrocellulose solutions from the above examples were subjected to simulated sunlight by the use of the Atlas Weatherometer of Atlas Devices Co., Chicago, Illinois. In this instrument light is produced by three carbon arcs. Before reaching the samples the light is passed through a Corex D filter which prevent hot particulate matter from the carbon arcs from impinging on the samples. The samples were exposed for controlled periods of time in clear bottles and the intensity of the color produced in the samples as indicated by the absorbance as measured by a spectrophotometer was plotted against time. The tests showed that after 95 hours exposure, samples containing dibenzoylmethane were substantially colorless while control samples containing no stabilizer turned to a bright yellow color. It should be noted that an exposure of 1 hour in the weatherometer is equivalent to about 1.6 days exposure to normal conditions of light.

Studies with benzoyl compounds other than dibenzoylmethane showed that compounds, such as, for example, benzoylacetone, benzoylacetanilid, hydroxybenzophenone, desoxybenzoin, benzophenone and benzil as well as the prior art compounds referred to above were considerably less effective than dibenzoylmethane or ineffective in preventing discoloration.

We claim:

1. A process for preventing the discoloration of nitrocellulose in solutions thereof which comprises adding to said solutions from about 5 to 80 parts by weight of dibenzoylmethane per 1,500 parts by weight of nitrocellulose.

2. A process of preventing the discoloration of nitrocellulose in nail enamel compositions which comprises adding to said nail compositions from about 5 to 80 parts by weight of dibenzoylmethane per 1,500 parts by weight of nitrocellulose.

3. A process according to claim 1 wherein about 10 to 50 parts by weight of dibenzoylmethane per 1,500 parts by weight of nitrocellulose are added.

4. A nail enamel composition comprising nitrocellulose, solvents and plasticizers which contains from about 5 to 80 parts by weight of dibenzoylmethane per 1,500 parts by weight of nitrocellulose.

5. A nail enamel composition according to claim 4 which contains from about 10 to 50 parts by weight of dibenzoylmethane per 1,500 parts by weight of nitrocellulose.

* * * * *